(12) United States Patent
Wardman et al.

(10) Patent No.: US 9,191,401 B2
(45) Date of Patent: Nov. 17, 2015

(54) SIGNED RESPONSE TO AN ABUSIVE EMAIL ACCOUNT OWNER AND PROVIDER SYSTEMS AND METHODS

(71) Applicant: EBAY INC., San Jose, CA (US)

(72) Inventors: Brad Wardman, San Jose, CA (US); Jeremy D. Pickett, San Jose, CA (US); Michael Weideman, Gretna, NE (US)

(73) Assignee: PAYPAL, INC., San Jose, CA (US)

( * ) Notice: Subject to any disclaimer, the term of this patent is extended or adjusted under 35 U.S.C. 154(b) by 78 days.

(21) Appl. No.: 13/918,631

(22) Filed: Jun. 14, 2013

(65) Prior Publication Data
US 2014/0373145 A1 Dec. 18, 2014

(51) Int. Cl.
*G06F 12/14* (2006.01)
*H04L 29/06* (2006.01)
*H04L 29/08* (2006.01)

(52) U.S. Cl.
CPC ........ *H04L 63/1416* (2013.01); *H04L 63/0428* (2013.01); *H04L 63/0442* (2013.01); *H04L 63/1441* (2013.01); *H04L 67/02* (2013.01)

(58) Field of Classification Search
USPC .......................................................... 726/23
See application file for complete search history.

(56) References Cited

U.S. PATENT DOCUMENTS

| 7,685,639 | B1 * | 3/2010 | McCorkendale et al. ...... 726/24 |
| 7,689,659 | B1 * | 3/2010 | Granoff et al. ................ 709/207 |
| 7,853,660 | B2 * | 12/2010 | Levy .............................. 709/206 |
| 8,073,910 | B2 * | 12/2011 | Tokuda et al. ................ 709/206 |
| 8,392,357 | B1 * | 3/2013 | Zou et al. ...................... 707/602 |
| 2002/0199120 | A1 * | 12/2002 | Schmidt ........................ 713/201 |
| 2004/0051736 | A1 * | 3/2004 | Daniell ......................... 345/752 |
| 2007/0220591 | A1 * | 9/2007 | Damodaran et al. ............. 726/4 |
| 2013/0080775 | A1 * | 3/2013 | Liebmann et al. ............ 713/168 |

\* cited by examiner

*Primary Examiner* — Amare F Tabor
(74) *Attorney, Agent, or Firm* — Haynes and Boone, LLP

(57) ABSTRACT

Systems and methods for abusive email account detection and transmission of a signed response to an abusive email account owner and provider. The methods include receiving an email from a first email account on a second email account, wherein the email contains malicious content, determining if a trust relationship exists between a first email server corresponding to the first email account and a second email server corresponding to the second email account, and transmitting, using a hardware processor of the second email server, an alert email to the first email account corresponding to the trust relationship, wherein the alert email includes a digital signature and a secure field having an abusive category descriptor in an email header. The secure field may include an abusive category descriptor, for example transmitting spam, transmitting malware, transmitting phishing attempts, and committing fraud.

24 Claims, 4 Drawing Sheets

SIGNED RESPONSE TO AN ABUSIVE EMAIL ACCOUNT OWNER AND PROVIDER SYSTEMS AND METHODS

BACKGROUND

1. Technical Field

The present application generally relates to actionable and/or malicious email detection and protection and more specifically to systems and methods for automated detection of abusive email accounts and transmission of a signed response to the abusive email account owner and provider.

2. Related Art

Users increasingly use email as a primary source of communication. However, security threats to user email accounts are more prevalent with the rise in this form of communication. For example, spam, malware, and phishing attempts are becoming much more common. Often, emails containing these threats are sent from shell or compromised email accounts. Compromised account owners may be unaware their account has been compromised and is sending malicious content. In other situations, shell accounts may be established by abusive actors to transmit malicious content. Thus, email providers of both receiving email accounts and abusive email accounts need to be made aware of the shell or compromised accounts in order to take proper actions to protect parties.

Figure 1:
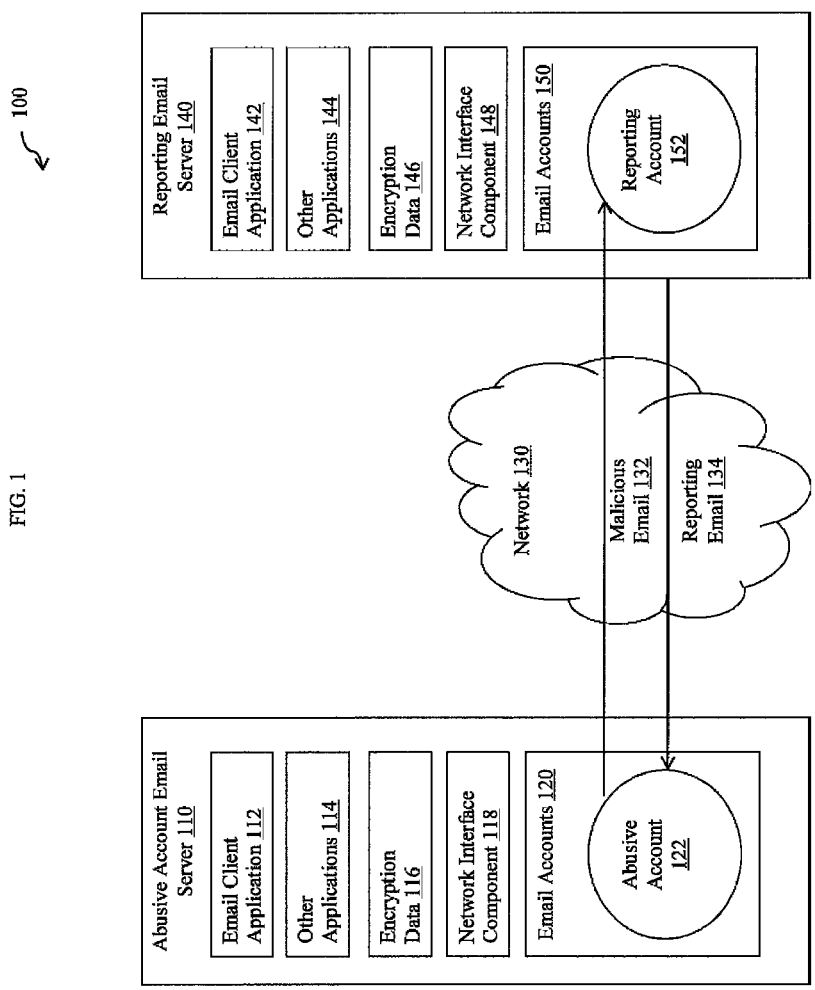
FIG. 1 is a block diagram of a networked system suitable for implementing the process described herein according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In one embodiment, a first email account may receive a suspicious email potentially containing malicious content, such as spam, malware, and/or phishing attempts, websites, and/or content. In response to receiving the suspicious email and determining a corresponding email account, a responding party, such as the first email account holder and/or responding email server, may transmit a reporting email to the suspicious and/or abusive email account and/or a mailing server corresponding to the suspicious and/or abusive email account. A trust relationship between the two servers may be previously established. For example, in certain embodiments, the reporting email contains a digital signature as a trust value including at least one field that may correspond to values in the email header allowing the holder of the suspicious email account to be warned of the abusive activity. Additionally, the reporting email may help the mailing server corresponding to the suspicious email account identify the account and take proper action. Thus, the suspicious email account and/or the corresponding mailing server may be informed of malicious activity. Additionally, the responding party's mailing server can be automatically informed of suspicious accounts.

In certain embodiments, the validity of the reporting email may be verified using an encryption key corresponding to the reporting email's digital signature. Such a key may be possessed by the decrypting party because of the prior established trust relationship. In one embodiment, the encryption key may be previously obtained by the suspicious email account and/or mailing server. However, in other embodiments, the encryption key may be transmitted with the reporting email or obtained from the signing authority through the Domain Name System (DNS).

FIG. 1 is a block diagram of a networked system suitable for implementing the process described herein according to an embodiment. As shown, a networked system environment 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

Networked system environment 100 may be configured to handle processes in accordance with embodiments provided herein. System environment 100 includes an abusive account email server 110 and a reporting email server 140 in communication over a network 130, for example through transmission and receipt of a malicious email 132. Additionally, reporting email server 140 and/or reporting account 152 may be in communication with abusive account email server and/or abusive account using a reporting email 134.

Abusive account email server 110 and reporting email server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system environment 100, and/or accessible over network 130.

Network 130 may be implemented as a single network or a combination of multiple networks. For example, in various embodiments, network 130 may include the Internet or one or more intranets, landline networks, wireless networks, and/or other appropriate types of networks. Thus, network 130 may correspond to small scale communication networks, such as a private or local area network, or a larger scale network, such as a wide area network or the Internet, accessible by the various components of system environment 100.

Abusive account email server 110 of FIG. 1 may include an email service provider server and corresponding email accounts, email clients, and other data and applications. Generally, abusive account email server 110 may be maintained by any entity that provides and services email accounts to users. In this regard, abusive account email server 110 may include email client application 112 accessible to a user, for example a web-based email client. However, in various embodiments, abusive account email server 110 maintains email accounts 120 for use with a locally available email client.

Email client application 112 may correspond to a web-based or client-side email client, for example MICROSOFT OUTLOOK®, GOOGLE GMAIL®, and YAHOO! MAIL®. Email client application 112 may allow a user to access an email account in order to transmit and receive emails. Thus, email client application 112 may include an interface and corresponding processes for use by a user.

In various embodiments, other applications 114 as may be desired in particular embodiments to provide desirable features to abusive account email server and/or a user. Other applications 114 may include security applications for implementing client and/or server-side security features, programmatic client applications for interfacing with appropriate application programming interfaces (APIs) over network 130, or other types of applications. For example, other applications 114 may contain software programs, such as a graphical user interface (GUI), executable by a processor that is configured to interface and communicate with the one or more client/user devices via the network 130. The GUI enables the client/user devices to access and communicate with abusive account email server 110, for example, to access and utilize email client application and corresponding processes. Other application 114 may include software, applications, and/or processes to retrieve encryption keys and/or decrypt data, such as digital signatures. Additionally, other applications 114 may include processes to identify abusive account 122 as a shell or compromised account from reporting email 134 and take appropriate action.

Abusive account email server 110 may include encryption data stored as encryption data 116. Encryption data 116 may correspond to stored encryption keys allowing abusive account email server 110 to decrypt data, including verifying digital signatures and/or decrypting secure fields. Encryption data 116 may be previously received by abusive account email server 110 through a secure process, through a shared secret, transmitted to abusive account email server 110, retrieved by abusive account email server 110, such as from a designated domain name and/or central key repository, and/or otherwise received. However, in other embodiments, encryptions data 116 may contain different or separate data corresponding to a trust relationship between abusive account email server 110 and other servers. Encryption data 116 may thus contain data corresponding to a trust relationship established between abusive email account server 110 and reporting email server 140.

In various embodiments, abusive account email server 110 includes at least one network interface component (NIC) 118 adapted to communicate with network 130 including reporting email server 140. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Abusive account email server 110 contains email accounts 120 including an abusive account 122 transmitting malicious email 132 and receiving reporting email 134. Email accounts 120 correspond generally to an email address and mailbox for exchange of emails. Abusive account 122 may correspond to a shell or compromised email account that is transmitting suspicious and/or malicious emails. For example, abusive account 122 may transmit spam, malware, and/or phishing emails and/or content. Abusive email account may be acting to defraud others through emails scams and/or abuse. Abusive account 122 may be known to be abusive by the account holder. However, in other embodiments, abusive account 122 may correspond to a compromised account where the holder is unaware of the accounts actions.

Reporting email server 140 of FIG. 1 may include an email service provider server and corresponding email accounts, email clients, and other data and applications. Generally, reporting email server 140 may be maintained by any entity that provides and services email accounts to users. In this regard, reporting email server 140 may include email client application 142 accessible to a user, for example a web-based email client. However, in various embodiments, reporting email server 140 maintains email accounts 150 for use with a locally available email client.

Email client application 142 may correspond to a web-based or client-side email client, for example MICROSOFT OUTLOOK®, GOOGLE GMAIL®, and YAHOO! MAIL®. Email client application 142 may allow a user to access an email account in order to transmit and receive emails. Thus, email client application 142 may include an interface and corresponding processes for use by a user.

In various embodiments, other applications 144 as may be desired in particular embodiments to provide desirable features to reporting email server 140 and/or a user. Other applications 144 may include security applications for implementing client and/or server-side security features, programmatic client applications for interfacing with appropriate application programming interfaces (APIs) over network 130, or other types of applications. For example, other applications 144 may contain software programs, such as a graphical user interface (GUI), executable by a processor that is configured to interface and communicate with the one or more client/user devices via the network 130. The GUI enables the client/user devices to access and communicate with reporting email server 140, for example to access and utilize email client application 142 and corresponding processes. Other application 144 may include software, applications, and/or processes to generate encryption keys and/or encrypt data, such as digital signatures. Additionally, other applications 144 may include processes to identify malicious email 132 as suspicious or malicious and generate reporting email 134.

Reporting email server 140 may include encryption data stored as encryption data 146. Encryption data 146 may correspond to generated and/or stored encryption keys allowing reporting email server 140 to encrypt data, including generating digital signatures and/or encrypting secure fields. Encryption data 146 may be previously generated by reporting email server 140 and transmitted to abusive account email server 110 through a secure process, through a shared secret, transmitted to abusive account email server 110, retrieved by abusive account email server 110, such as from a designated domain name and/or central key repository, and/or otherwise transmitted. However, in other embodiments, encryptions data 146 may contain different or separate data corresponding to a trust relationship between reporting email server 110 and other servers. Encryption data 146 may thus contain data corresponding to a trust relationship established between abusive email account server 110 and reporting email server 140.

In various embodiments, reporting email server 140 includes at least one network interface component (NIC) 148 adapted to communicate with network 130 including abusive account email server 110. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Reporting email server 140 contains email accounts 150 including a receiving account 152 receiving malicious email 132 and transmitting reporting email 134. Email accounts 150 correspond generally to an email address and mailbox for exchange of emails. Receiving account 152 may correspond to an email account that is receiving suspicious and/or malicious emails. For example, receiving account 152 may receive spam, malware, and/or phishing emails and/or content. Receiving account 152 may know malicious email 132 to be suspicious or malicious. However, in other embodiments, receiving account 152 may be unaware of the email purpose and/or content. Thus, reporting server 140 may contain other processes and/or application to identify malicious email 132 as suspicious or malicious.

Reporting email server 140 transmits reporting email 134. As will be discussed below, reporting email 134 may correspond to an alert email that may be generated by reporting email server 140 in response to malicious email 132 and contain a secure field, such as digital signature. Reporting email 134 may be generated consistent with a prior trust relationship established with abusive account email server 110. Additionally, reporting email 134 may have a secure field which information abusive account email server 110 of the nature of malicious email 130.

DomainKeys Identified Mail (DKIM) is the example trust relationship that may exist between abusive account email server 110 and reporting email server 140. DKIM attaches a new domain name identifier to a message and uses cryptographic techniques to validate authorization for its presence. The identifier is independent of any other identifier in the message, such in the author's From: field. DKIM may include a method using a cryptographic hash for the receiving mail provider, abusive account email server 110 of FIG. 1, to know if an email message, reporting email 134, was sent by a domain, reporting email server 140. In various embodiments, the cryptographic hash may also allow the receiving mail provider to know who the sending mail provider is, establishing the trust relationship, for example through transmission of a cryptographic key or key repository location on a DNS.

In other embodiments, email accounts 120 may include email accounts transmitting emails that are not malicious and/or abusive but instead are actionable by a receiving email account, such as reporting account 152. For example, reporting email server 140 and/or reporting account 152 may be set to recognize specific emails by a controller of reporting email server 140 or user of reporting account 152. In those embodiments, reporting email server 140 and/or reporting account 152 may transmit reporting email 134 using the methods described herein in response to receiving the actionable email.

For example, reporting account 152 may be set to recognize an actionable email from a banking institution and respond with a reporting email to the server and/or email account of the banking institution. The reporting email may be transmitted with using the prior established trust relationship. Thus, the reporting email may contain a digital signature in the header and may include a secure field. The digital signature may provide validity of the email. Additionally, the secure field may notify the banking institution of type of email received, an action by the user of reporting account 152, or other data.

Figure 2:
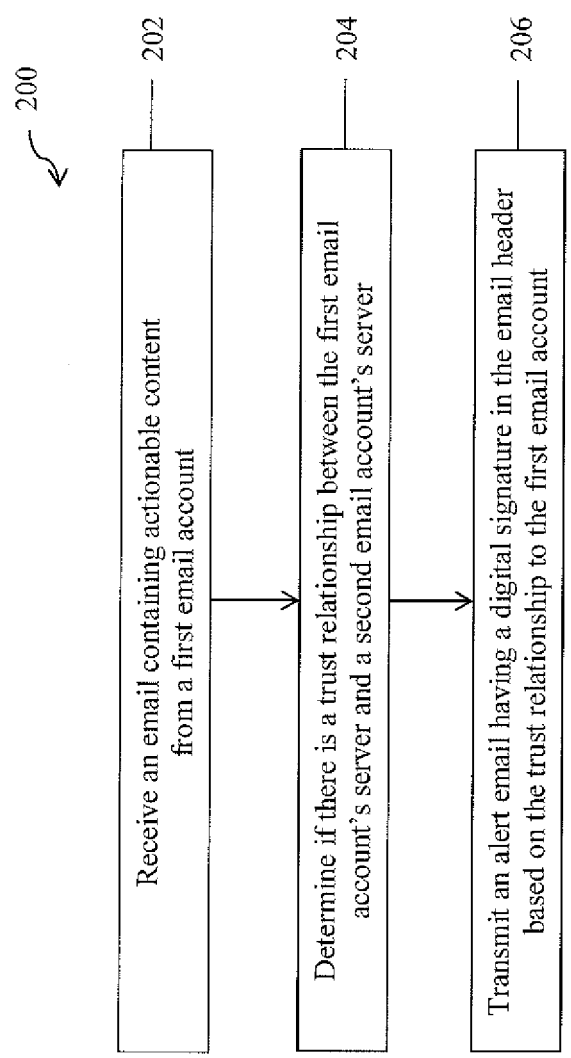
FIG. 2 is a flowchart showing an exemplary process by an email server for transmitting a signed response email to an email account and server.

FIG. 2 is a flowchart showing an exemplary process by an email server for transmitting a signed response email to an email account and server. Note that one or more steps, processes, and methods described herein may be omitted, performed in a different sequence, or combined as desired or appropriate.

At step 202 of flowchart 200, an email with actionable content, such as malicious email 132, is received from a first email account, which is potentially a shell or compromised email account, such as abusive account 122. The email may include suspicious and/or malicious content, such as spam, malware, and/or phishing content. For example, the content may execute processes when opening the email, provide web links to malicious websites, and/or other contain harmful content. The email may be transmitted by the authority of the shell, malicious, or compromised account, where the account holder may be unaware the account is transmitting malicious emails. A reporting email account, such as reporting account 152 corresponding to reporting email server 140, may receive the email with actionable content.

The email server corresponding to the receiving/reporting account may determine the first email account is acting maliciously based on suspicious content. Reporting email server 140 may contain software and/or processes to determine the email, such as malicious email 132, is suspicious or malicious. For example, reporting email server 140 may identify components of the malicious email as spam, malware, and/or phishing, or may identify a previously stored sender. In other embodiments, reporting email server 140 may provide for reporting functions for the receiving account holder, for example a user interface button or forwarding email address. The first email account may be attempting to retrieve private security information from a receiving account through fraud or other deceit. Thus, the receiving account may report and/or transmit the malicious email to a reporting service corresponding to reporting email server 140.

In various embodiments, the actionable email may correspond to an email the reporting email account is set to identify. In such embodiments, the actionable email is not malicious, however, the reporting email account will still continue with the process shown in flowchart 200. Thus, the reporting email account determines the actionable email may contain identifiable content initiating a reporting email as a response. As discussed above, the reporting email account may be set to automatically determine the email is actionable, or the reporting email server may provide reporting functions.

At step 204, the email server determines if a trust relationship exists between the first email account's server and itself, the second email account's server. The email server may do so by examining a database containing digital signatures and/or encryption keys. In other embodiments, the email server may look up encryption keys, for example on the DNS, and determine if the email server can form a trust relationship with the first email account's server or may request a relationship with the first email account's server.

Once the first email account is determined to be acting maliciously, the reporting server may take steps to alert the abusive account email server of the abusive account. Thus, at step 206, an alert email is generated and transmitted, where the alert email includes a digital signature in the header of the email. The digital signature may be formed in accordance with the trust relationship. Additionally, the header may contain a secure field, which may be encrypted. In certain embodiments, the secure field may be encrypted using a symmetric-key encryption, where the key is previously shared with the decrypting entity. In other embodiments, the private key of an asymmetric key pair encrypts the field. The decrypting key may be shared with the decrypting entity through a secure process, through a shared secret, transmitted to the decrypting entity, retrieved by decrypting entity, such as from a designated domain name and/or central key repository, and/or other key sharing method.

The digital signature enables verification of reporting server 140, thus allowing for verification of the alert email and the contents of the email. Using the secure field, abusive account 122 and abusive actions can be reported to abusive account email server 110. Thus, through the secure field, the abusive account email server may determine the category of abuse. Additionally, the abusive account email server may retrieve a key to decrypt the secure field through a secure process, through a shared secret, transmitted and/or retrieved from the reporting email server, such as from a designated domain name and/or central key repository, and/or other process.

Figure 3:
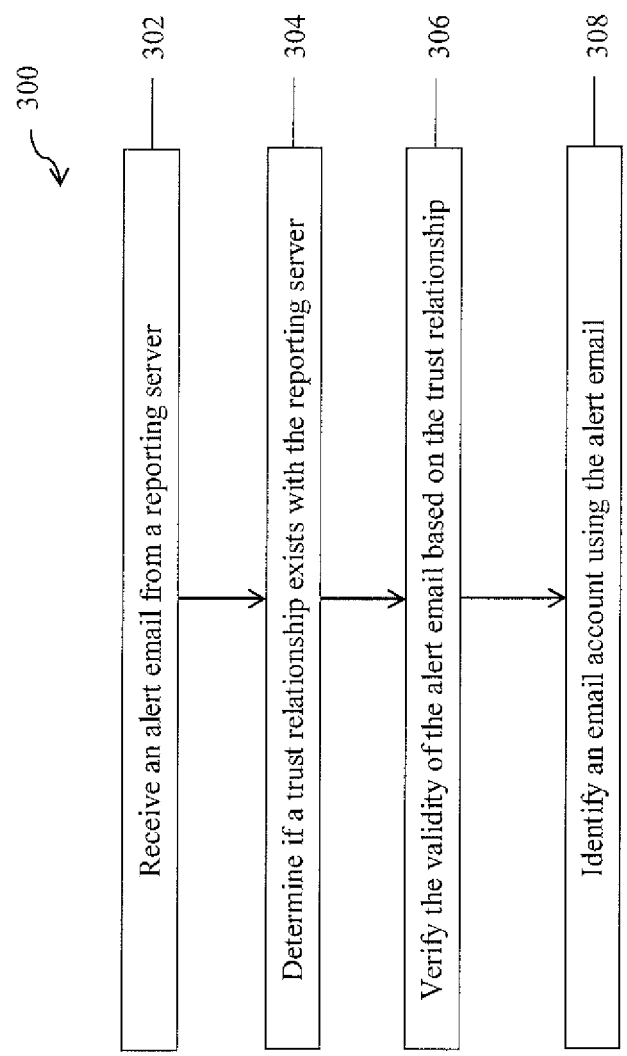
FIG. 3 is a flowchart showing an exemplary process by an email account and/or server receiving a signed response email.

FIG. 3 is a flowchart showing an exemplary process by an email account and/or server receiving a signed response email. Note that one or more steps, processes, and methods described herein may be omitted, performed in a different sequence, or combined as desired or appropriate.

At step 302 of flowchart 300, an alert email is received from a reporting server, such as reporting email server 140 and/or reporting account 152. The alert email may be generated and transmitted as previously discussed and contain a digital signature in the email header. Additionally, the email and/or header may contain a corresponding secure field. The abusive account, such as abusive account 122, may receive the email alerting the holder of the potentially compromised account, for example if the reporting server directly emails the abusive account. In various embodiments, the abusive account's server may receive the alert email.

However, where the abusive account is used as a shell account and/or purposefully transmitting the malicious emails, a corresponding email server needs to be alerted of the abusive account. Thus, at step 304, an email server corresponding to the abusive account determines if a trust relationship exists with the reporting server. Abusive account 122 has a corresponding email server, such as abusive account email server 110. The email server may have a prior trust relationship established with the reporting email server, such as through the sharing of encryption keys, digital signatures, or other relationships. In other embodiments, the email server may form a trust relationship with the reporting server; for example, by looking up the encryption key on the DNS, or by receiving the encryption key in the alert email.

At step 306, the email server of the abusive account verifies the alert email is from the sender, the reporting server, using the digital signature and the trust relationship. Thus, the email server of the abusive account is able to identify the reporting server through the digital signature and/or the trust relationship to ensure the alert email is valid. Additionally, the abusive account's email server may decrypt the secure field to receive additional data, such as a category of abuse.

Using the data in the field, the email server of the abusive account is able to determine the abusive nature of the abusive account. For example, the reporting server may flag the abusive account as spam, transmitting malware, and/or committing fraud. The secure field may be verified using the trust relationship.

Using the received alert email, the email server of the abusive account can identify the first email account and flag it as abusive at step 308. Thus, the email server is able to notify the holder of the email account, prevent future transmission of malicious emails, or take other protective steps. In some embodiments the email server may terminate or close the abusive account and/or prevent access to the email account and/or email server by the holder of the abusive account, for example by blocking a corresponding IP address.

In some embodiments, the alert email may be configured to be transmitted to actionable content that is not malicious, such as in response to specific emails and/or specific emailing parties. Thus, in such embodiments, the alert email may instead alert the receiving email account and/or server of receipt of a prior transmitted email, and verify validity using a digital signature.

Figure 4:
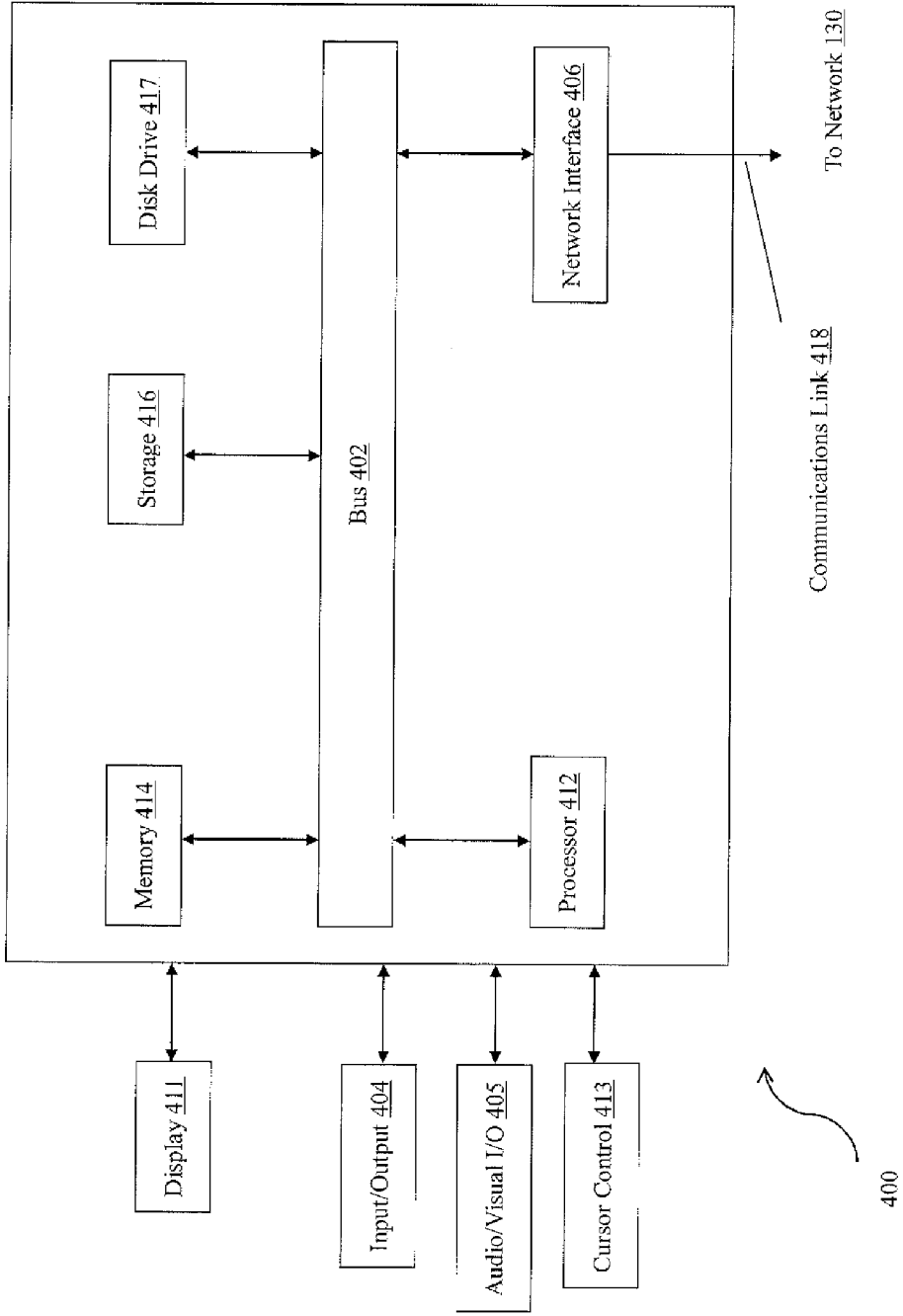
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The payment provider may utilize a network computing device (e.g., a network server) capable of communicating with the network. It should be appreciated that each of the devices utilized by users and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 130. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing user account information, wherein the user account information comprises email account information; and
   one or more hardware processors in communication with the non-transitory memory and configured to:
      receive an email from a first email account on a second email account, wherein the email contains actionable content;
      determine that a trust relationship exists between a first email server corresponding to the first email account and a second email server corresponding to the second email account; and
      transmit a reporting email to the first email account corresponding to the trust relationship, wherein the reporting email comprises an alert of the actionable content that is separate from the email containing the actionable content and in response to receiving the email from the first email account, wherein the reporting email includes a digital signature in an email header to verify validity of the trust relationship, wherein the first email server determines the first email account is malicious based on data in a secure field in the reporting email, and wherein the first email server flags the first email account with a category of abuse using the data.

2. The system of claim 1, wherein the actionable content is malicious content.

3. The system of claim 1, wherein the email header further includes the secure field.

4. The system of claim 3, wherein the secure field is encrypted.

5. The system of claim 4, wherein the secure field is produced using symmetric-key encryption.

6. The system of claim 4, wherein the secure field is produced using a private key of an asymmetric key pair, and wherein the first mail server possess a public key of the asymmetric key pair.

7. The system of claim 6, wherein the one or more hardware processors is further configured to:
   generate the asymmetric key pair; and
   transmit the public key to the first mail server.

8. The system of claim 7, wherein the public key is transmitted to the first mail server using the reporting email.

9. The system of claim 3, wherein the data in the secure field includes an abusive category descriptor.

10. The system of claim 9, wherein the abusive category descriptor includes one of transmitting spam, transmitting malware, transmitting phishing attempts, and committing fraud.

11. A method comprising:
    receiving an email from a first email account on a second email account, wherein the email contains malicious content;
    determining that a trust relationship exists between a first email server corresponding to the first email account and a second email server corresponding to the second email account; and
    transmitting, using a hardware processor of the second email server, an alert email to the first email account corresponding to the trust relationship, wherein the alert email comprises an alert of the malicious content that is separate from the email containing the malicious content and in response to receiving the email from the first email account, wherein the alert email includes a digital signature to verify validity of the trust relationship and a secure field having an abusive category descriptor in an email header, wherein the first email server determines the first email account is malicious based on data in the secure field in the reporting email, and wherein the first email server flags the first email account with a category of abuse using the data.

12. The method of claim 11, wherein the secure field includes an abusive category descriptor.

13. The method of claim 11, wherein the secure field is produced using symmetric-key encryption.

14. The method of claim 11, wherein the secure field is produced using a private key of an asymmetric key pair, and wherein the first mail server possess a public key of the asymmetric key pair.

15. The method of claim 14 further comprising:
generating the asymmetric key pair; and
transmitting the public key to the first mail server.

16. A non-transitory computer readable medium comprising a plurality of machine-readable instructions which when executed by one or more processors of a server are adapted to cause the server to perform a method comprising:
receiving an email from a first email account on a second email account, wherein the email contains malicious content;
determining that a trust relationship exists between a first email server corresponding to the first email account and a second email server corresponding to the second email account; and
transmitting an alert email to the first email account corresponding to the trust relationship, wherein the alert email comprises an alert of the malicious content that is separate from the email containing the malicious content and in response to receiving the email from the first email account, wherein the alert email includes a digital signature to verify validity of the trust relationship and a secure field having an abusive category descriptor in an email header, wherein the first email server determines the first email account is malicious based on data in the secure field in the reporting email, and wherein the first email server flags the first email account with a category of abuse using the data.

17. The non-transitory computer readable medium of claim 16, wherein the secure field includes an abusive category descriptor.

18. The non-transitory computer readable medium of claim 16, wherein the secure field is produced using symmetric-key encryption.

19. The non-transitory computer readable medium of claim 16, wherein the secure field is produced using a private key of an asymmetric key pair, and wherein the first mail server possess a public key of the asymmetric key pair.

20. The non-transitory computer readable medium of claim 16, wherein the method further comprises:
generating the asymmetric key pair; and
transmitting the public key to the first mail server.

21. A system comprising:
a non-transitory memory storing user account information, wherein the user account information comprises email account information; and
one or more hardware processors in communication with the non-transitory memory and configured to:
receive an alert email from a first server wherein the alert email comprises an alert of malicious content in an email received by a first email account of the first server that is separate from the email containing the malicious content and in response to the email received by the first email account;
determine that a trust relationship exists with the first server;
verify the alert email is from the first server using a digital signature in the alert email generated using the trust relationship; and
identify a second email account transmitting the email using the alert email, wherein the first email server determines the second email account is malicious based on data in a secure field in the reporting email, and wherein the first email server flags the second email account with a category of abuse using the data.

22. The system of claim 21, wherein the one or more hardware processors are further configured to identify the email account and an abusive action corresponding to the alert email.

23. The system of claim 22, wherein the abusive action includes at least one of transmitting spam, transmitting malware, transmitting phishing attempts, and committing fraud.

24. The system of claim 21, wherein the one or more hardware processors is further configured to prevent access to the email account.

* * * * *